United States Patent
Kawasaki

(10) Patent No.: US 9,856,164 B2
(45) Date of Patent: Jan. 2, 2018

(54) OPTICAL FIBER PREFORM AND METHOD OF MANUFACTURING OPTICAL FIBER

(71) Applicant: FURUKAWA ELECTRIC CO., LTD., Tokyo (JP)

(72) Inventor: Mitsuhiro Kawasaki, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/631,442

(22) Filed: Jun. 23, 2017

(65) Prior Publication Data
US 2017/0283301 A1 Oct. 5, 2017

Related U.S. Application Data

(63) Continuation of application No. PCT/JP2016/050518, filed on Jan. 8, 2016.

(30) Foreign Application Priority Data

Jan. 9, 2015 (JP) .................................. 2015-002768
Mar. 13, 2015 (JP) .................................. 2015-051402

(51) Int. Cl.
*G02B 6/02* (2006.01)
*C03B 37/012* (2006.01)

(52) U.S. Cl.
CPC .............. *C03B 37/012* (2013.01); *G02B 6/02* (2013.01)

(58) Field of Classification Search
CPC ................................. G02B 6/02; C03B 37/012
See application file for complete search history.

(56) References Cited

U.S. PATENT DOCUMENTS 4,568,370 A * 2/1986 Powers ................. C03B 37/014
  65/403
5,394,500 A * 2/1995 Marchman ............. G02B 6/245
  385/123

(Continued)

FOREIGN PATENT DOCUMENTS

JP     08325028 A   * 12/1996   ........ C03B 37/01446
JP     10-81535        3/1998

(Continued)

OTHER PUBLICATIONS

International Search Report dated Apr. 12, 2016 in PCT/JP2016/050518, filed on Jan. 8, 2016 (with English Translation).

(Continued)

*Primary Examiner* — Daniel Petkovsek
(74) *Attorney, Agent, or Firm* — Oblon, McClelland, Maier & Neustadt, L.L.P.

(57) ABSTRACT

An optical fiber preform includes: a columnar portion having an approximately constant radius of r; and a taper portion located adjacent to the columnar portion in a lengthwise direction and having a radius decreasing along the lengthwise direction. The taper portion includes: a first taper portion including a portion having a radius varying between 0.9r and 0.6r; and a second taper portion including a portion having a radius varying between 0.4r and 0.15r. A diameter of the first taper portion in the portion having the radius varying between 0.9r and 0.6r decreases so as to form a maximum angle $\theta_1$ between 40 degrees and 60 degrees with respect to the columnar portion, a diameter of the second taper portion in the portion having the radius varying between 0.4r and 0.15r decreases so as to form an average angle $\theta_2$ between 5 degrees and 30 degrees with respect to a central axis in the lengthwise direction, and a volume of the taper portion is smaller than or equal to 45% of a volume (Continued)

of a column having a same outer diameter as a maximum outer diameter of the taper portion and having a same length as the taper portion.

12 Claims, 4 Drawing Sheets

(56) References Cited

U.S. PATENT DOCUMENTS

| | | | | |
|---|---|---|---|---|
| 5,812,723 | A * | 9/1998 | Ohtsu | B82Y 20/00 385/123 |
| 7,854,146 | B2 * | 12/2010 | Sowa | C03B 37/01211 65/412 |
| 8,457,456 | B2 * | 6/2013 | Kopp | B29D 11/0075 385/11 |
| 9,158,070 | B2 * | 10/2015 | Farmer | G02B 6/14 |
| 2005/0204780 | A1 | 9/2005 | Moridaira et al. | |
| 2009/0272152 | A1 | 11/2009 | Moridaira et al. | |

FOREIGN PATENT DOCUMENTS

| | | |
|---|---|---|
| JP | 2001-122635 | 5/2001 |
| JP | 2002-80238 | 3/2002 |
| JP | 2003-327440 | 11/2003 |

OTHER PUBLICATIONS

Written Opinion dated Apr. 12, 2016 in PCT/JP2016/050518, filed on Jan. 8, 2016.

* cited by examiner

OPTICAL FIBER PREFORM AND METHOD OF MANUFACTURING OPTICAL FIBER

CROSS-REFERENCE TO RELATED APPLICATIONS

This application is a continuation of International Application No. PCT/JP2016/050518, filed on Jan. 8, 2016, which claims the benefit of priority from Japanese Patent Application No. 2015-002768, filed on Jan. 9, 2015, and Japanese Patent Application No. 2015-051402, filed on Mar. 13, 2015, the entire contents of which are incorporated herein by reference.

BACKGROUND

The present disclosure relates to an optical fiber preform and a method of manufacturing an optical fiber.

An optical fiber is manufactured by heating and melting one end of an optical fiber preform made of glass in a fiber drawing and heating furnace, drawing the glass optical fiber from the one end, and forming a coating made of resin or the like on an outer circumference of the drawn glass optical fiber by using a die.

However, a tip portion of the optical fiber preform may include a defective portion where a ratio between an outer diameter of a core portion and an outer diameter of a cladding portion deviates from a standard. A glass optical fiber drawn from such a tip portion may not be used as a product because the core diameter and the cladding diameter deviate from the standard. Such a tip portion of the optical fiber preform is used to draw a fiber to adjust various conditions of fiber drawing when a manufacturing process of the optical fiber is started.

When the manufacturing process of the optical fiber is started, a drawing speed of the glass optical fiber (a fiber speed) is set to a low fiber speed at first because of a reason such as to adjust various conditions of fiber drawing. Thereafter, when conditions to draw a non-defective glass optical fiber are satisfied, the fiber speed is accelerated to a predetermined high fiber speed. Thereafter, the fiber speed is controlled to be constant at the predetermined fiber speed and a glass optical fiber that is made into a product is manufactured.

Here, a technique is disclosed in which a shape of the tip portion of the optical fiber preform is formed to be able to shorten a time of fiber drawing of the tip portion in order to shorten a start-up time of the manufacturing process of the optical fiber and draw a non-defective glass optical fiber in an early stage (for example, see JP 2002-80238 A). Further, JP 2003-327440 A discloses a technique in which a shape of a tip of a glass tube that forms an outer circumference of the optical fiber preform is previously made close to a meniscus shape that is a shape of the optical fiber preform melted during fiber drawing.

By the way, to improve efficiency of the manufacturing process of the optical fiber, it is required to further shorten the start-up time of the manufacturing process of the optical fiber. In particular, in a case of an optical fiber preform whose diameter is enlarged to manufacture the optical fiber at low cost, the volume of the tip portion of the optical fiber preform is also large. As a result, the start-up time of the manufacturing process of the optical fiber until a non-defective glass optical fiber is drawn becomes long. Such elongation of start-up time causes excessive consumption of raw material because a lot of optical fiber that does not become a product is drawn, so that it is further required to shorten the start-up time.

There is a need for an optical fiber preform that may shorten the start-up time of the manufacturing process of the optical fiber and a method of manufacturing the optical fiber by using the optical fiber preform.

SUMMARY

An optical fiber preform according to one aspect of the present disclosure includes: a columnar portion having an approximately constant radius of r; and a taper portion located adjacent to the columnar portion in a lengthwise direction and having a radius decreasing along the lengthwise direction, wherein the taper portion includes: a first taper portion including a portion having a radius varying between 0.9r and 0.6r; and a second taper portion including a portion having a radius varying between 0.4r and 0.15r, a diameter of the first taper portion in the portion having the radius varying between 0.9r and 0.6r decreases so as to form a maximum angle $\theta 1$ between 40 degrees and 60 degrees with respect to the columnar portion, a diameter of the second taper portion in the portion having the radius varying between 0.4r and 0.15r decreases so as to form an average angle $\theta 2$ between 5 degrees and 30 degrees with respect to a central axis in the lengthwise direction, and a volume of the taper portion is smaller than or equal to 45% of a volume of a column having a same outer diameter as a maximum outer diameter of the taper portion and having a same length as the taper portion.

The above and other objects, features, advantages and technical and industrial significance of this disclosure will be better understood by reading the following detailed description of the disclosure, when considered in connection with the accompanying drawings.

DETAILED DESCRIPTION

Figure 1:
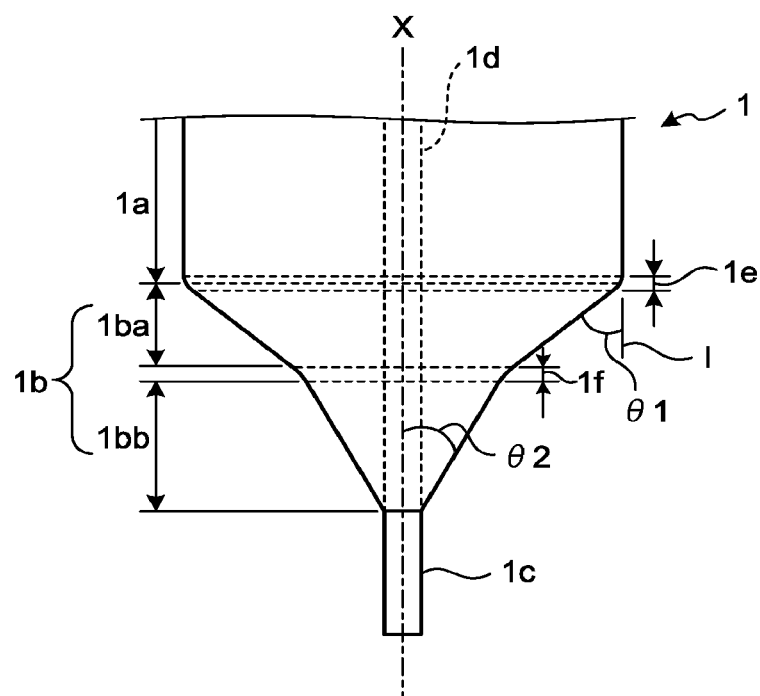
FIG. 1 is a schematic diagram of an optical fiber preform according to an embodiment.

Hereinafter, an embodiment of an optical fiber preform and a method of manufacturing an optical fiber according to the present disclosure will be described with reference to the drawings. The present disclosure is not limited by the embodiment. In the drawings, the same or corresponding components are properly denoted by the same reference numerals.

Embodiment

FIG. 1 is a schematic diagram of an optical fiber preform according to the embodiment. An optical fiber preform 1 is made of, for example, glass such as silica based glass. The optical fiber preform 1 is manufactured by forming a porous layer by depositing glass fine particles on an outer circumference of a target rod made of, for example, silica based glass and dehydrating the porous layer to form sintered glass. The optical fiber preform 1 includes a columnar portion 1a, a taper portion 1b, and a falling portion 1c.

The columnar portion 1a has a radius r, which is approximately constant, and has a columnar shape extending in a lengthwise direction. The columnar portion 1a is a portion where a non-defective glass optical fiber that is made into a product is drawn. The taper portion 1b is a portion which is located adjacent to the columnar portion 1a and whose radius decreases in the lengthwise direction. The taper portion 1b includes a defective portion which is a part where even when a glass optical fiber is drawn from the part, the glass optical fiber may not be used as a product. Here, the defective portion is a part where an outer diameter ratio between a core portion and a cladding portion deviates from a desired standard or a part that does not include the core portion. An optical fiber drawn from the defective portion should be disposed as waste.

At a drawing start end (facing the falling portion 1c) of the optical fiber preform 1, in a portion which is near a boundary between the columnar portion 1a and the taper portion 1b and at which the outer diameter of the optical fiber preform 1 begins to decrease, a portion where its radius is 98% or less of the radius r of the optical fiber preform 1 is defined as the taper portion 1b.

Here, the radius of the columnar portion 1a may vary in some degree in the longitudinal direction. In this case, a maximum radius of the optical fiber preform 1 in the portion near the boundary between the columnar portion 1a and the taper portion 1b is defined as r.

The falling portion 1c is located at a tip side of the taper portion 1b where its diameter is reduced. The falling portion 1c functions as a weight of the glass optical fiber when drawing of the optical fiber preform 1 described later is started.

A target rod 1d has, for example, a core portion and a cladding portion and is connected to a dummy rod inside the taper portion 1b. The falling portion 1c may be formed by, for example, a tip portion of the dummy rod.

In this case, it is preferable that a connection portion between the target rod 1d and the dummy rod is located near the boundary between the columnar portion 1a and the taper portion 1b and inside the taper portion 1b in order to effectively use the target rod 1d as a non-defective portion.

A boundary between the taper portion 1b and the falling portion 1c is located at a higher position (in a direction away from the drawing start end) among a position where the radius of the optical fiber preform 1 is minimum and a position where the radius of the optical fiber preform 1 is 0.1r. When there is no portion where the radius of the optical fiber preform 1 is minimum and there is a long portion where the radius of the optical fiber preform 1 is smallest in the lengthwise direction, the highest position of the long portion is defined as the boundary between the taper portion 1b and the falling portion 1c.

Next, the taper portion 1b will be specifically described. The taper portion 1b has a first taper portion 1ba and a second taper portion 1bb. The first taper portion 1ba is located on the side of the columnar portion 1a in the lengthwise direction. The radius of the first taper portion 1ba varies between 0.9r and 0.6r with respect to the radius r described above, and the diameter of the first taper portion 1ba decreases so as to form a maximum angle θ1 between 40 degrees and 60 degrees with respect to the columnar portion 1a. Here, decreasing the diameter so as to form the maximum angle θ1 with respect to the columnar portion 1a means that when cutting the optical fiber preform 1 along a cut surface including a central axis X in the lengthwise direction, a maximum value of an angle between a line 1 in parallel with the central axis X and an outer circumference of the first taper portion 1ba in the cut surface is θ1.

More specifically, the maximum angle θ1 is a maximum angle between a straight line connecting two adjacent measurement points and a line 1 in parallel with the central axis X in the lengthwise direction of the optical fiber preform 1 when measuring the outer diameter of the optical fiber preform 1 for every 5 mm in the lengthwise direction of the optical fiber preform 1 in a portion where the radius of the optical fiber preform 1 varies between 0.9r and 0.6r.

Here, a reason to define the maximum angle will be described below.

When drawing a portion where the radius of the first taper portion 1ba varies between 0.9r and 0.6r, it is necessary to raise the fiber speed to smoothly reach a target fiber speed while accelerating the fiber speed.

If an angle of the maximum angle θ1 is too large, when a portion of the angle softens and becomes an optical fiber, the amount of fiber drawing rapidly increases as compared with the amount of fiber drawing per unit time immediately before that time. Therefore, the fiber speed suddenly increases and it is not possible to achieve smooth increase of the fiber speed. Therefore, to shorten a start-up process described later, it is preferable that the maximum angle θ1 in the first taper portion 1ba is 60 degrees or less. If the angle is too small, the amount of fiber drawing from the first taper portion 1ba increases, so that it may take time for the start-up process. Therefore, it is preferable that the maximum angle θ1 in the first taper portion 1ba is 40 degrees or more.

Further, from a viewpoint of achieving smooth increase of the fiber speed and suppressing increase of the amount of fiber drawing, it is more preferable that an average angle in the first taper portion 1ba is 45 to 55 degrees.

It is preferable that the outer circumferences of the columnar portion 1a and the first taper portion 1ba are connected to form a curved surface along the lengthwise direction in a connection region 1e which is a region where the columnar portion 1a and the first taper portion 1ba are connected. In other words, when cutting the optical fiber preform 1 along a cut surface including the central axis X, an outer circumference of the connection region 1e forms a curved surface of radius R1 in the cut surface. Here, the connection region 1e is a region that lies across the border of the columnar portion 1a and the first taper portion 1ba and the outer circumference of the connection region 1e forms a curved surface. In the connection region 1e, the radius of the optical fiber preform 1 smoothly varies from the radius of the columnar portion 1a to 0.9r. When the connection region 1e does not form a curved surface of a constant radius, that is, when R gradually changes, it is assumed that the radius R1 indicates a radius of circle approximation of a region of radius of 0.98r to 0.9r. Further, there is a case in which the connection region 1e does not form a curved surface, that is, the connection region 1e has an apex between the columnar portion 1a and the taper portion 1b. In this case, it is defined that the radius R1 is zero.

The second taper portion 1bb is located closer to the drawing start end than the first taper portion 1ba in the lengthwise direction. The radius of the second taper portion 1bb varies between 0.4r and 0.15r and the diameter of the second taper portion 1bb decreases so as to form an average angle θ2 between 5 degrees and 30 degrees with respect to the central axis X in the lengthwise direction. In other words, when cutting the optical fiber preform 1 along a cut surface including the central axis X, an average value of an angle between the central axis X and the outer circumference of the second taper portion 1*bb* on the cut surface is θ2.

More specifically, the average angle θ2 is an average angle between a straight line connecting two adjacent measurement points and the central axis X in the lengthwise direction of the optical fiber preform 1 when measuring the outer diameter of the optical fiber preform 1 for every 5 mm in the lengthwise direction of the optical fiber preform 1 in a portion where the radius of the optical fiber preform 1 varies between 0.4r and 0.15r.

Here, a reason to define the average angle will be described below.

Temperature of a portion where the radius varies between 0.4r and 0.15r in the second taper portion 1*bb* reaches a softening temperature in a short time by heating because the portion of the optical fiber preform 1 is thin. Further, the amount of glass per unit length of the above portion is smaller than that of a portion where the radius varies between 0.9r and 0.6r in the first taper portion 1*ba*, so that even when the outer diameter rapidly varies in some degree, the variation may be absorbed by fiber drawing control. A portion where the radius varies between 0.4r and 0.15r in the second taper portion 1*bb* is provided to ensure an initial acceleration and smoothly change to a portion where the radius varies between 0.9r and 0.6r in the first taper portion 1*ba*, so that the "average" angle is important. However, from a view point of smooth initial acceleration, it is more preferable that the maximum angle in the second taper portion 1*bb* is 40 degrees or less.

The outer circumferences of the first taper portion 1*ba* and the second taper portion 1*bb* are connected to form a curved surface of radius R2 along the lengthwise direction in a connection portion 1*f* which is a portion that connects the first taper portion 1*ba* and the second taper portion 1*bb*. The connection portion 1*f* is a portion which is included in the taper portion 1*b* and whose outer circumference forms a curved surface between the first taper portion 1*ba* and the second taper portion 1*bb*. In the connection portion 1*f*, the radius of the optical fiber preform 1 smoothly varies from 0.6r to 0.4r. When the connection portion 1*f* does not form a curved surface of a constant radius, it is assumed that the radius R2 indicates a radius of circle approximation of a region of radius of 0.55r to 0.45r. Further, there is a case in which the connection portion 1*f* does not form a curved surface, that is, the connection portion 1*f* has an apex. In this case, it is defined that the radius R2 is zero.

Here, the taper portion 1*b* of the optical fiber preform 1 according to the present embodiment has the first taper portion 1*ba* and the second taper portion 1*bb* as described above, the radius of the first taper portion 1*ba* varies between 0.9r and 0.6r, and the diameter of the first taper portion 1*ba* decreases so as to form the maximum angle θ1 between 40 degrees and 60 degrees. Further, the radius of the second taper portion 1*bb* varies between 0.4r and 0.15r and the diameter of the second taper portion 1*bb* decreases so as to form the average angle θ2 between 5 degrees and 30 degrees. Furthermore, when assuming a column having the same outer diameter as a maximum outer diameter of the taper portion 1*b* and having the same length as that of the taper portion 1*b*, the volume of the taper portion 1*b* is smaller than or equal to 45% of the volume of the column. Thereby, when the optical fiber preform 1 is used to manufacture an optical fiber, it is possible to shorten the start-up time of the manufacturing process of the optical fiber.

Specifically, the radius of the second taper portion 1*bb* varies between 0.4r and 0.15r and the diameter of the second taper portion 1*bb* decreases so as to form the average angle θ2 between 5 degrees and 30 degrees, so that the volume of the second taper portion 1*bb* is relatively smaller than that of the columnar portion 1*a* of the optical fiber preform 1 and therefore the second taper portion 1*bb* melts quickly and the initial fiber speed may be easily accelerated. The first taper portion 1*ba* that will melt subsequently is gradually heated and softened while the second taper portion 1*bb* is melting, so that melting of the first taper portion 1*ba* is smoothly started after that. Further, the radius of the first taper portion 1*ba* varies between 0.9r and 0.6r and the diameter of the first taper portion 1*ba* decreases so as to form the maximum angle θ1 between 40 degrees and 60 degrees, so that when the melting is started, the fiber speed when the second taper portion 1*bb* is melted may be smoothly inherited and accelerated and it is possible to smoothly move into drawing of non-defective glass optical fiber that is made into a product from the columnar portion 1*a* that melts subsequently. Thereby, it is possible to perform good acceleration of the fiber speed and shorten the start-up time of the manufacturing process of the optical fiber.

Further, in the optical fiber preform 1, the outer circumferences of the columnar portion 1*a* and the first taper portion 1*ba* are connected to form a curved surface of radius R1 along the lengthwise direction in the connection region 1*e*, so that the diameter of the optical fiber preform 1 varies smoothly. Therefore, variation of the fiber speed of drawing the glass optical fiber when a portion from which the fiber is drawn moves from the first taper portion 1*ba* to the columnar portion 1*a* is suppressed. It is preferable that the columnar portion 1*a* and the first taper portion 1*ba* are connected to form a curved surface of radius of 30 mm or more. Furthermore, in the optical fiber preform 1, the outer circumferences of the first taper portion 1*ba* and the second taper portion 1*bb* are connected to form a curved surface of radius R2 along the lengthwise direction in the connection portion 1*f*, so that the diameter of the optical fiber preform 1 varies smoothly. Therefore, variation of the fiber speed when a portion from which the fiber is drawn moves from the second taper portion 1*bb* to the first taper portion 1*ba* is suppressed. It is preferable that the first taper portion 1*ba* and the second taper portion 1*bb* are connected to form a curved surface of radius of 40 mm or more.

Such a shape of the taper portion 1*b* may be realized by shaping a tip portion of an optical fiber preform, which is manufactured by, for example, a known method, by grinding or the like.

Figure 2:
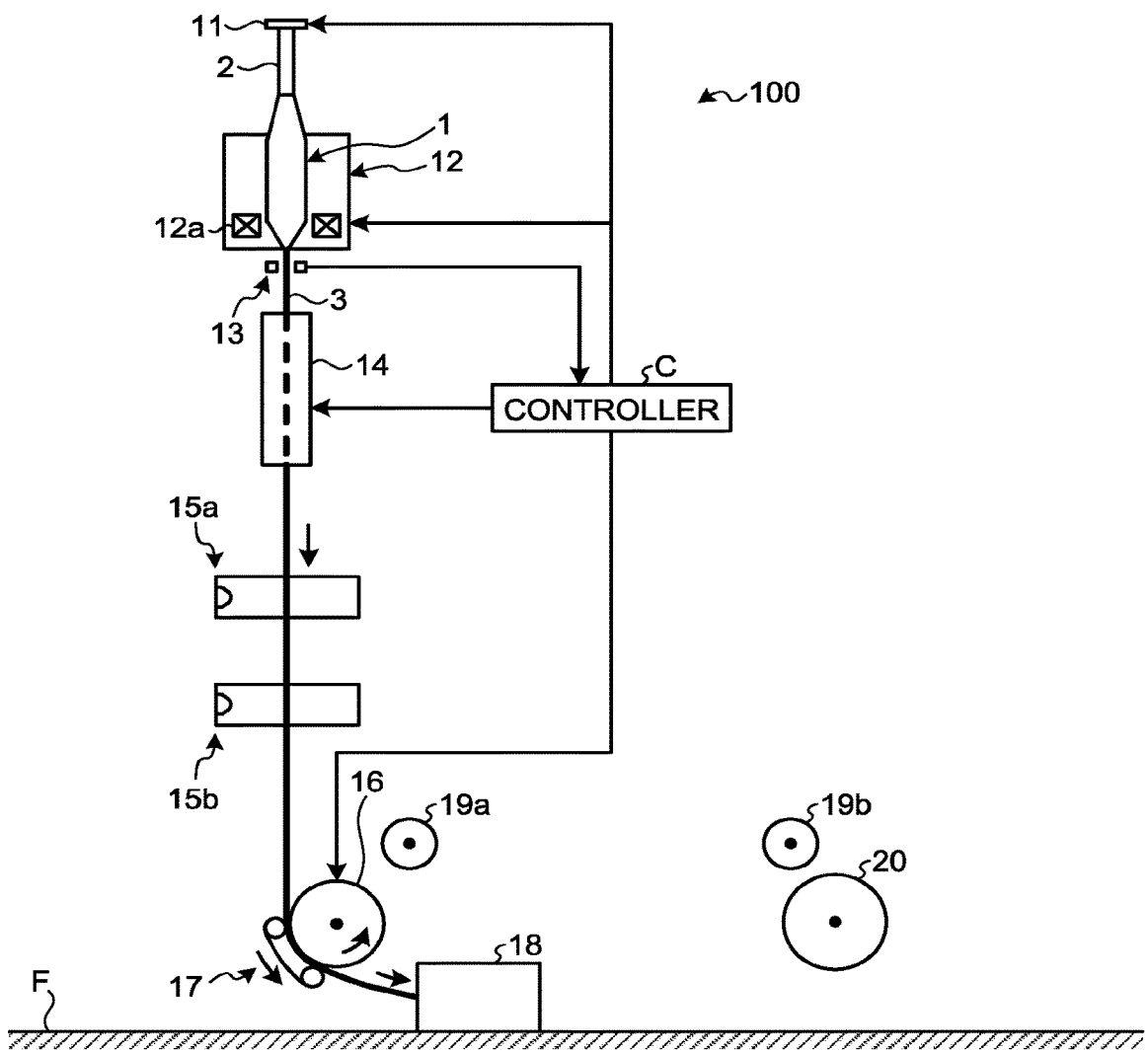
FIG. 2 is a schematic diagram illustrating an entire configuration of an optical fiber manufacturing apparatus.

Next, a method of manufacturing an optical fiber by using the optical fiber preform 1 according to the present embodiment. FIG. 2 is a schematic diagram illustrating an entire configuration of an optical fiber manufacturing apparatus. As illustrated in FIG. 2, an optical fiber manufacturing apparatus 100 includes an elevating mechanism 11 that holds a glass supporting rod 2 welded to an upper end of the optical fiber preform 1 and moves up and down the optical fiber preform 1, a fiber drawing and heating furnace 12 that has a heater 12*a* and heats and melts one end of the optical fiber preform 1, an outer diameter measuring instrument 13 that measures an outer diameter of a glass optical fiber 3 drawn from the optical fiber preform 1, a cooling tower 14 that may blow He gas to the glass optical fiber 3 and cool the glass optical fiber 3, UV lamp irradiation chambers 15*a* and 15*b* arranged in a passage of the glass optical fiber 3, a capstan roller 16 made of rubber, which is used as a receiving mechanism, a pressing mechanism 17 having a structure in which a rubber belt is stretched between two rollers, an optical fiber collector 18, guide rolls 19*a* and 19*b*, and a winding mechanism 20. The manufacturing apparatus 100 further includes a controller C that receives data of the outer diameter of the glass optical fiber 3 measured by the outer diameter measuring instrument 13 and controls the elevating mechanism 11, the fiber drawing and heating furnace 12, the cooling tower 14, the capstan roller 16 based on the data of the outer diameter and the like.

Hereinafter, a method of manufacturing the optical fiber will be described. First, the optical fiber preform 1 where the supporting rod 2 is welded to the upper end thereof is set in the fiber drawing and heating furnace 12, and the supporting rod 2 is held by the elevating mechanism 11. Next, while the elevating mechanism 11 is moving the optical fiber preform 1 downward, the heater 12a heats and melts the tip of the optical fiber preform 1 and the drawing of the glass optical fiber is started. When a tip portion of the taper portion 1b of the optical fiber preform 1 is heated and melted, first, the falling portion 1c of the optical fiber preform 1 falls as a weight and the glass optical fiber 3 is drawn by being pulled by the falling portion 1c. Subsequently, the outer diameter measuring instrument 13 measures the outer diameter of the drawn glass optical fiber 3 and transmits data of the outer diameter to the controller C. Further, the glass optical fiber 3 passes through the cooling tower 14 and sequentially passes through the UV lamp irradiation chambers 15a and 15b in which UV lamps are turned off. However, at this time, the glass optical fiber 3 is not cooled and no coating is formed. Next, the capstan roller 16 receives the glass optical fiber 3 in a state in which the glass optical fiber 3 is pressed against a surface of the capstan roller 16 by the rubber belt of the pressing mechanism 17. Next, the optical fiber collector 18 on a floor F introduces the glass optical fiber 3 into its inside and collects the glass optical fiber 3. The optical fiber collector 18 is to collect the glass optical fiber 3 so that the glass optical fiber 3 does not scatter around. For example, a hollow container made of metal or plastic may be used as the optical fiber collector 18. Further, a rotation mechanism that shreds the glass optical fiber may be provided inside the optical fiber collector 18 in order to collect the glass optical fiber 3 more smoothly. The optical fiber collector 18 may include a mechanism that collects the glass optical fiber by winding the glass optical fiber around a bobbin.

When drawing the glass optical fiber 3 from the optical fiber preform 1, first, the glass optical fiber 3 is drawn from the second taper portion 1bb so that the outer diameter of the glass optical fiber 3 is larger than the outer diameter of the glass optical fiber to be a product while the fiber speed is being controlled, and various conditions to draw non-defective glass optical fiber are adjusted while the glass optical fiber 3 is being drawn. The glass optical fiber 3 is drawn so that the outer diameter of the glass optical fiber 3 is larger than the outer diameter of the glass optical fiber to be a product, so that the second taper portion 1bb is consumed rapidly. Therefore, it is possible to shorten the start-up time. Further, as described above, the radius of the second taper portion 1bb varies between 0.4r and 0.15r and the second taper portion 1bb has a portion whose diameter decreases so as to form the average angle θ2 between 5 degrees and 30 degrees, so that the second taper portion 1bb melts quickly and the fiber speed is easily controlled. Therefore, various conditions of fiber drawing may be easily adjusted.

After completion of the adjustment of the various conditions of fiber drawing, the fiber speed is decelerated. Thereafter, a die for forming a coating on the outer circumference of the glass optical fiber 3 is arranged while continuing the drawing of the glass optical fiber 3. In this way, the fiber speed is decelerated and the die is attached while continuing the drawing, so that troublesome operations such as moving the apparatus and adjusting the position of the apparatus when the apparatus is returned to the original position are not required. Therefore, it is possible to quickly and easily start the manufacturing of the optical fiber that is made into a product. The die is attached, the optical fiber collector 18 is moved, and the pressing mechanism 17 is removed. Thereafter, the start-up process is performed in which the fiber speed is increased to a fiber speed of drawing a glass optical fiber that is made into a product. If the taper portion 1b is grinded into a minimum volume, all of which is consumed while the fiber speed is being increased, it is possible to most efficiently perform the start-up of the fiber drawing.

In the present embodiment, the die for forming a coating is attached after a predetermined amount of glass optical fiber 3 is drawn. However, the die may be attached immediately after the falling portion 1c falls as a weight.

When the forming of the coating is started after a predetermined amount of glass optical fiber 3 is drawn, there is an effect of reducing the amount of coating used in the start-up process of the fiber drawing.

The fiber speed is controlled by the controller C. Specifically, the controller C controls rotation speed of the capstan roller 16 and thereby the fiber speed is controlled, the controller C controls a vertical movement amount of the elevating mechanism 11 and thereby a preform feed length is controlled, and the controller C controls the elevating mechanism 11 and the capstan roller 16 based on the data from the outer diameter measuring instrument 13 and thereby the outer diameter of the glass optical fiber 3 is controlled. The preform feed length means a downward feed length of the optical fiber preform from a predetermined height position and is an amount relatively indicating an input amount of the optical fiber preform 1 to the fiber drawing and heating furnace 12.

As described above, the second taper portion 1bb melts quickly and the initial fiber speed may be easily accelerated. The first taper portion 1ba that will melt subsequently is gradually heated and softened while the second taper portion 1bb is melting, so that melting of the first taper portion 1ba is smoothly started after that. Further, when the melting is started, the fiber speed when the second taper portion 1bb is melted may be smoothly inherited and accelerated and it is possible to smoothly move into drawing of non-defective glass optical fiber that is made into a product from the columnar portion 1a that melts subsequently.

In the connection region 1e between the columnar portion 1a and the first taper portion 1ba, the outer circumferences of the columnar portion 1a and the first taper portion 1ba are connected to form a curved surface along the lengthwise direction, so that the variation of the fiber speed of drawing the glass optical fiber is suppressed and control becomes easy. Furthermore, in the connection portion 1f between the first taper portion 1ba and the second taper portion 1bb, the outer circumferences of the first taper portion 1ba and the second taper portion 1bb are connected to form a curved surface along the lengthwise direction, so that the variation of the fiber speed is suppressed and control becomes easy. When the control becomes easy in this way, it is easy to converge the fiber speed into a desired range, so that the fiber speed may be stably increased and it is possible to shorten a time until a target fiber speed is reached.

Figure 3:
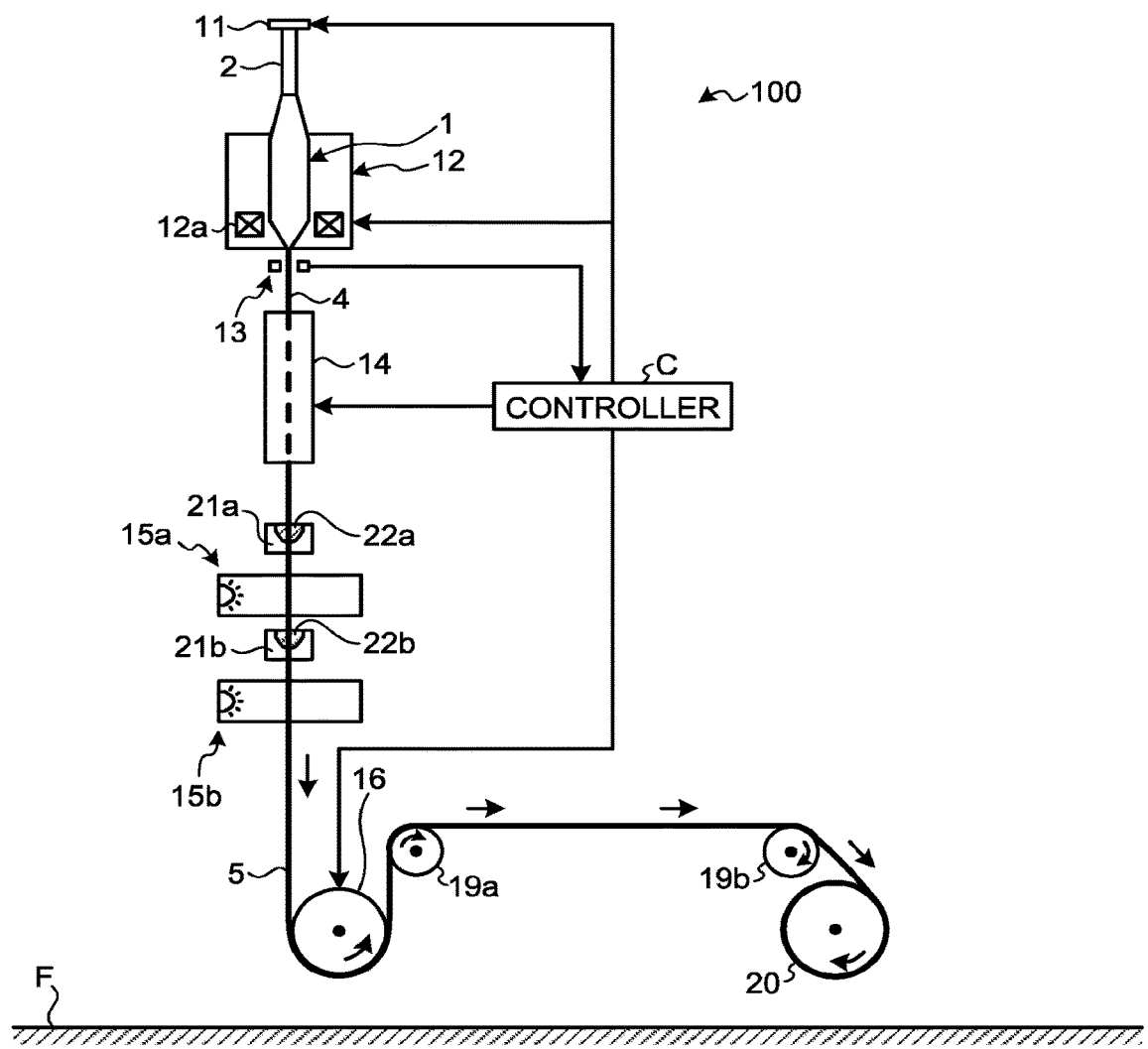
FIG. 3 is a schematic diagram illustrating a state in which an optical fiber is manufactured as a product.

After the fiber speed is increased to a target value, as illustrated in FIG. 3, a glass optical fiber 4 that should be made into a product is drawn according to a normal manufacturing process of an optical fiber. At this time, for example, an outer diameter of the glass optical fiber 4 is set within a predetermined error range from a predetermined value within a range between 80 and 130 μm. The fiber speed of the glass optical fiber 4 is controlled to be within a predetermined error range of the fiber speed so that the outer diameter is within the above error range. It is possible to draw the glass optical fiber 4 that satisfies standards such as product standards from the optical fiber preform 1 that has been drawn from the taper portion 1b. In the drawing of the glass optical fiber 4, the cooling tower 14 controlled by the controller C cools the glass optical fiber 4, so that the fiber speed may be very high. After the cooling tower 14 cools the glass optical fiber 4, a primary die 21a to which a resin 22a for primary coating is supplied applies the resin 22a to the glass optical fiber 4, and the primary coating is formed by curing the resin 22a in the UV lamp irradiation chamber 15a. Further, a secondary die 21b to which a resin 22b for secondary coating is supplied applies the resin 22b to an outer circumference of the primary coating, and the secondary coating is formed by curing the resin 22b in the UV lamp irradiation chamber 15b. As a result, an optical fiber 5 on which a coating is formed is manufactured. The optical fiber 5 is received by the same capstan roller 16 as that used when drawing the glass optical fiber 3, guided by the guide rolls 19a and 19b, and wound by the winding mechanism 20.

Figure 4:
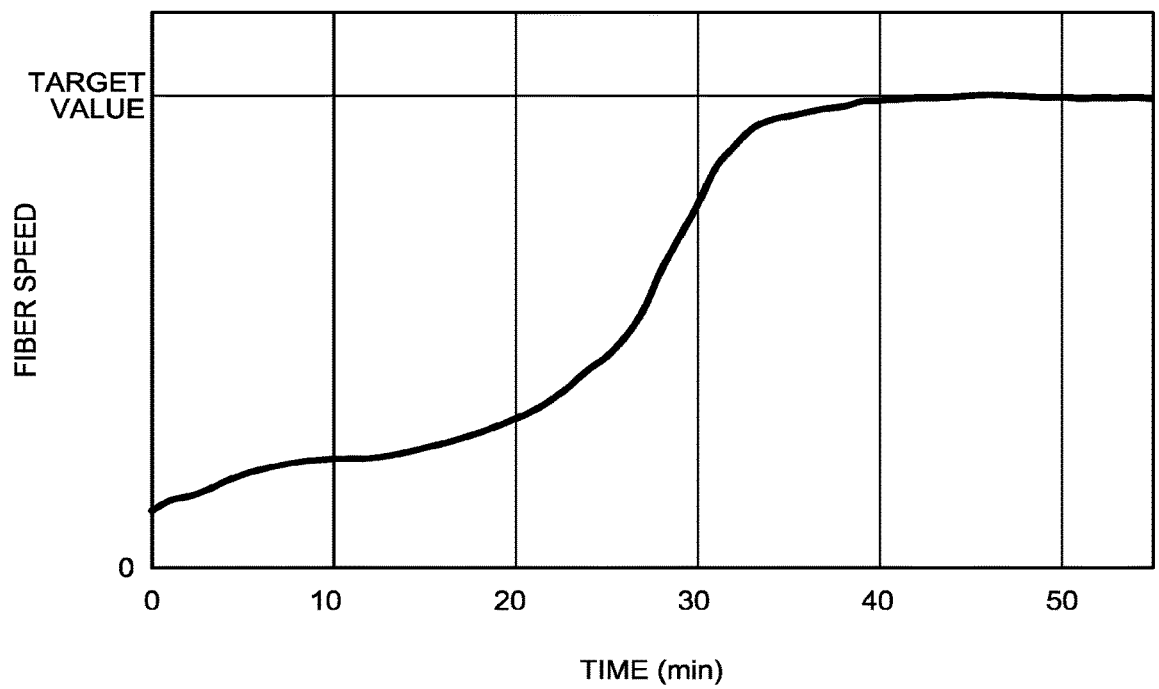
FIG. 4 is a diagram illustrating an example of control of fiber speed of a glass optical fiber.

FIG. 4 is a diagram illustrating an example of control of the fiber speed of the glass optical fiber 4. In FIG. 4, the horizontal axis indicates an elapsed time from a time point when an increase of the fiber speed is started in order to draw a glass optical fiber that is made into a product after the dies are attached. As illustrated in FIG. 4, after the fiber speed reaches a target speed, control is performed to maintain the fiber speed. The control corresponds to control in a fifth example described later.

Examples and Comparative Examples

As examples 1.1 to 1.4 and 2 to 10 of the present disclosure, the optical fiber preform according to the embodiment illustrated in FIG. 1 is created. Regarding the created optical fiber preform, the maximum angle θ1 and the average angle θ2 related to the first and the second taper portions, the radii R1 and R2 of the curved surfaces formed by the connection portions, the radius of the optical fiber preform (preform radius), a ratio of the volume of the taper portion with respect to the volume of a column having the same radius as that of the optical fiber preform (preform radius) and the same length as that of the taper portion (taper portion volume ratio) are variously changed. When the radius R1 or the radius R2 is zero, it means that the corresponding connection portion does not form a curved surface. An optical fiber is manufactured by using the manufacturing apparatus illustrated in FIGS. 2 and 3 by using the created optical fiber preform, the start-up time at this time is measured, and presence or absence of variation of the outer diameter of the glass optical fiber when a portion from which a fiber is drawn moves from the second taper portion to the first taper portion and when the portion from which a fiber is drawn moves from the first taper portion to the columnar portion is evaluated. Here, the start-up time is time from when a weight falls to when the fiber speed of the glass optical fiber reaches a target speed. As the comparative examples 1.1 to 2.2 and 3 to 5, optical fiber preforms are created that do not satisfy definitions of the present disclosure regarding the maximum angle θ1, the average angle θ2, or the taper portion volume ratio. An optical fiber is manufactured by using the manufacturing apparatus illustrated in FIGS. 2 and 3 by using a created optical fiber preform, the start-up time at this time is measured, and presence or absence of variation of the outer diameter of the glass optical fiber is evaluated. Table 1 illustrates results of the above. In Table 1, when there is variation of the outer diameter of the glass optical fiber when the portion from which a fiber is drawn moves from the first taper portion to the columnar portion, "presence" is written.

TABLE 1

| | θ1 deg | θ2 deg | R1 mm | R2 mm | Preform Radius mm | Taper Portion Volume Ratio % | Start-Up Time min | Outer Diameter Variation |
|---|---|---|---|---|---|---|---|---|
| Example 1.1 | 44 | 23 | 30 | 40 | 90 | 20 | 36 | |
| Example 1.2 | 44 | 23 | 0 | 0 | 90 | 20 | 50 | Presence |
| Example 1.3 | 44 | 23 | 30 | 0 | 90 | 20 | 40 | |
| Example 1.4 | 44 | 23 | 0 | 40 | 90 | 20 | 45 | Presence |
| Example 2 | 44 | 15 | 30 | 60 | 90 | 34 | 37 | |
| Example 3 | 54 | 5 | 40 | 40 | 86 | 25 | 26 | |
| Example 4 | 52 | 12 | 50 | 70 | 60 | 23 | 25 | |
| Example 5 | 49 | 16 | 45 | 60 | 90 | 27 | 35 | |
| Example 6 | 60 | 30 | 50 | 60 | 88 | 30 | 33 | |
| Example 7 | 40 | 16 | 30 | 80 | 90 | 31 | 30 | |
| Example 8 | 53 | 17 | 35 | 50 | 75 | 31 | 25 | |
| Example 9 | 45 | 15 | 30 | 30 | 80 | 28 | 55 | |
| Example 10 | 45 | 15 | 20 | 50 | 70 | 30 | 55 | Presence |
| Comparative Example 1.1 | 17 | 17 | 0 | 0 | 81.5 | 33 | 80 | Presence |
| Comparative Example 1.2 | 40 | 40 | 0 | 0 | 88.5 | 33 | 75 | Presence |
| Comparative Example 2.1 | 17 | 17 | 30 | 0 | 81.5 | 33 | 75 | |
| Comparative Example 2.2 | 40 | 40 | 30 | 0 | 88.5 | 33 | 70 | |
| Comparative Example 3 | 35 | 15 | 40 | 60 | 87 | 30 | 71 | |
| Comparative Example 4 | 55 | 40 | 30 | 60 | 80 | 20 | 76 | |
| Comparative Example 5 | 43 | 10 | 100 | 300 | 82.5 | 49 | 107 | |

As illustrated in Table 1, the start-up time is short such as 25 minutes to 55 minutes in the examples 1.1 to 1.4 and 2 to 10, in which the maximum angle θ1 is between 40 degrees and 60 degrees, the average angle θ2 is between 5 degrees and 30 degrees, and the taper portion volume ratio is 45% or less. On the other hand, the start-up time is 70 minutes or more in the comparative examples 1.1 to 2.2 and 3 to 5.

Main examples will be specifically described. First, in the example 1.1, the maximum angle θ1 is between 40 degrees and 60 degrees, the average angle θ2 is between 5 degrees and 30 degrees, the radius R2 is 40 mm, the radius R1 is 30 mm, and the taper portion volume ratio is 20%. However, the start-up time is 36 minutes which is short. The example 1.2 is different from the example 1.1 in that the radii R1 and R2 are zero. Thereby, when the portion from which the fiber is drawn moves from the second taper portion to the first taper portion and when the portion from which the fiber is drawn moves from the first taper portion to the columnar portion, variation of the fiber speed of the glass optical fiber occurs and there is a variation of the outer diameter. It is considered that the start-up time becomes 50 minutes because the acceleration of the fiber speed is lower than that in the example 1.1 in order to control the variation. However, as known from comparison between the example 1.2 and each comparative example, even when the radii R1 and R2 are zero, if the maximum angle θ1 is between 40 degrees and 60 degrees, the average angle θ2 is between 5 degrees and 30 degrees, and the taper portion volume ratio is 45% or less, it is possible to obtain an effect of shortening the start-up time.

The example 1.3 is different from the example 1.2 in that the radius R1 is larger 30 mm. It is considered that the start-up time becomes shorter 40 minutes because of the above. The example 1.4 is different from the example 1.2 in that the radius R2 is larger 40 mm. It is considered that the start-up time becomes 45 minutes because of the above. When comparing the example 1.3 and the example 1.4, it is considered that the radius R1 contributes to shorten the start-up time more than the radius R2. Regarding the example 9, it is considered that the start-up time becomes 55 minutes because the radius R2 is smaller than 40 mm. Regarding the example 10, it is considered that the start-up time becomes 55 minutes because the radius R1 is smaller than 30 mm.

Next, main comparative examples will be specifically described. First, in the comparative examples 1.1 and 1.2, the maximum angle θ1 is the same as the average angle θ2, and R1 and R2 are zero. However, the volume of the taper portion is relatively large. Further, when the portion from which the fiber is drawn moves from the first taper portion to the columnar portion, variation of the fiber speed of the glass optical fiber occurs and there is a variation of the outer diameter. It is considered that the start-up time becomes long because of the above reasons. The comparative examples 2.1 and 2.2 are different from the comparative examples 1.1 and 1.2 in that the radius R1 is larger 30 mm. It is considered that the start-up time becomes short because of the above. Regarding the comparative example 3, it is considered that the start-up time becomes long because the maximum angle θ1 is small. Regarding the comparative example 4, it is considered that the start-up time becomes long because the angle θ2 is large. In the comparative example 5, the taper portion has a meniscus shape. However, it is considered that the start-up time becomes long because the taper portion volume ratio is large.

In the above embodiment, the case in which the radius of the columnar portion 1a of the optical fiber preform 1 is approximately constant includes a case in which the radius r varies within a range of about 10% in the lengthwise direction. Even when the radius of the columnar portion 1a of the optical fiber preform 1 varies within a range as described above, if the outer diameter ratio between the core portion and the cladding portion is constant, it is possible to draw a non-defective glass optical fiber 4 from the columnar portion 1a.

The present disclosure is preferable in that the start-up time increased due to enlargement of the diameter of the columnar portion may be shortened by applying the present disclosure to an optical fiber preform in which the radius of the columnar portion is enlarged to 40 mm or more as in the example described above.

The present disclosure is not limited by the embodiment described above. An optical fiber preform formed by appropriately combining the components described above is also included in the present disclosure. Also, additional effects and modified examples may be easily derived by those skilled in the art. Therefore, broader aspects of the present disclosure are not limited to the above embodiment, but various modifications are possible.

According to the present disclosure, there is an effect that it is possible to realize an optical fiber preform that may shorten the start-up time of the manufacturing process of the optical fiber and a method of manufacturing the optical fiber whose process time is shortened.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber preform comprising:
    a columnar portion having an approximately constant radius of r; and
    a taper portion located adjacent to the columnar portion in a lengthwise direction and having a radius decreasing along the lengthwise direction,
    wherein the taper portion includes:
        a first taper portion including a portion having a radius varying between 0.9r and 0.6r; and
        a second taper portion including a portion having a radius varying between 0.4r and 0.15r,
    a diameter of the first taper portion in the portion having the radius varying between 0.9r and 0.6r decreases so as to form a maximum angle θ1 between 40 degrees and 60 degrees with respect to the columnar portion,
    a diameter of the second taper portion in the portion having the radius varying between 0.4r and 0.15r decreases so as to form an average angle θ2 between 5 degrees and 30 degrees with respect to a central axis in the lengthwise direction, and
    a volume of the taper portion is smaller than or equal to 45% of a volume of a column having a same outer diameter as a maximum outer diameter of the taper portion and having a same length as the taper portion.

2. The optical fiber preform according to claim 1, further comprising a falling portion located at a tip side of the taper portion and functioning as a weight of the glass optical fiber when drawing of the optical fiber preform is started.

3. The optical fiber preform according to claim 1, wherein the columnar portion and the first taper portion are connected by a region having an outer circumference forming a curved surface with a radius of 30 mm or more along the lengthwise direction.

4. The optical fiber preform according to claim 1, wherein the first taper portion and the second taper portion are connected by a connection portion having an outer circumference forming a curved surface with a radius of 40 mm or more along the lengthwise direction.

5. The optical fiber preform according to claim 1, wherein the radius of the columnar portion is 40 mm or more.

6. The optical fiber preform according to claim 1, wherein the taper portion is formed by grinding.

7. A method of manufacturing an optical fiber, the method comprising:
    drawing a glass optical fiber by heating and melting a tip portion of a taper portion of an optical fiber preform; and
    forming a coating on an outer circumference of the drawn glass optical fiber, wherein
    the optical fiber preform including:
        a columnar portion having an approximately constant radius of r; and
        the taper portion located adjacent to the columnar portion in a lengthwise direction and having a radius decreasing along the lengthwise direction,
    the taper portion includes:
        a first taper portion including a portion having a radius varying between 0.9r and 0.6r; and
        a second taper portion including a portion having a radius varying between 0.4r and 0.15r, a diameter of the first taper portion in the portion having the radius varying between 0.9r and 0.6r decreases so as to form a maximum angle θ1 between 40 degrees and 60 degrees with respect to the columnar portion, a diameter of the second taper portion in the portion having the radius varying between 0.4r and 0.15r decreases so as to form an average angle θ2 between 5 degrees and 30 degrees with respect to a central axis in the lengthwise direction, and a volume of the taper portion is smaller than or equal to 45% of a volume of a column having a same outer diameter as a maximum outer diameter of the taper portion and having a same length as the taper portion.

8. The method of manufacturing an optical fiber according to claim 7, further comprising a falling portion located at a tip side of the taper portion and functioning as a weight of the glass optical fiber when drawing of the optical fiber preform is started.

9. The method of manufacturing an optical fiber according to claim 7, wherein the columnar portion and the first taper portion are connected by a region having an outer circumference forming a curved surface with a radius of 30 mm or more along the lengthwise direction.

10. The method of manufacturing an optical fiber according to claim 7, wherein the first taper portion and the second taper portion are connected by a connection portion having an outer circumference forming a curved surface with a radius of 40 mm or more along the lengthwise direction.

11. The method of manufacturing an optical fiber according to claim 7, wherein the radius of the columnar portion is 40 mm or more.

12. The method of manufacturing an optical fiber according to claim 7, wherein the taper portion is formed by grinding.

\* \* \* \* \*